United States Patent [19]

Roehrig et al.

[11] Patent Number: 4,685,347
[45] Date of Patent: Aug. 11, 1987

[54] INDEXABLE STAR WHEEL

[75] Inventors: Phillip J. Roehrig, Rockford; Neal R. Gray, Machesney Park, both of Ill.

[73] Assignee: Amerock Corporation, Rockford, Ill.

[21] Appl. No.: 814,264

[22] Filed: Dec. 30, 1985

[51] Int. Cl.⁴ .................... G04B 19/24; E05F 15/10
[52] U.S. Cl. ..................................... 74/436; 74/461; 192/139
[58] Field of Search ............... 74/436, 411, 409, 461, 74/435, 437, 526; 192/139, 149; 403/116, 113

[56] References Cited

U.S. PATENT DOCUMENTS

| | | | |
|---|---|---|---|
| 2,764,034 | 9/1956 | Hotline | 74/461 |
| 3,168,839 | 2/1965 | Chvatlinsky | 74/435 |
| 3,173,301 | 3/1965 | Miller | 74/461 |
| 3,446,085 | 5/1969 | Ginsberg | 74/411 |
| 3,496,802 | 2/1970 | Cork et al. | 74/409 |
| 4,466,310 | 8/1984 | Rulseh | 74/436 |
| 4,473,301 | 9/1984 | Namyslo | 74/461 |
| 4,553,656 | 11/1985 | Lense | 192/142 R |

Primary Examiner—Cornelius J. Husar
Assistant Examiner—Peter M. Cuomo
Attorney, Agent, or Firm—Leydig, Voit & Mayer, Ltd.

[57] ABSTRACT

A star wheel is formed with angularly spaced teeth and intervening pockets and is indexed through one step each time a rotatable actuating pin enters one of the pockets. One of the teeth has a significantly greater angular width than the other teeth and has a tip which is periodically engaged by the pin to stop rotation of the pin. To reduce shock resulting from the pin striking the tip of the wide tooth, a slot is formed in the wide tooth to cause part of the outer end portion of the tooth to be resiliently cantilevered on the remaining portion of the tooth and to enable the outer end portion to flex inwardly when the pin moves into engagement with the tip.

9 Claims, 5 Drawing Figures

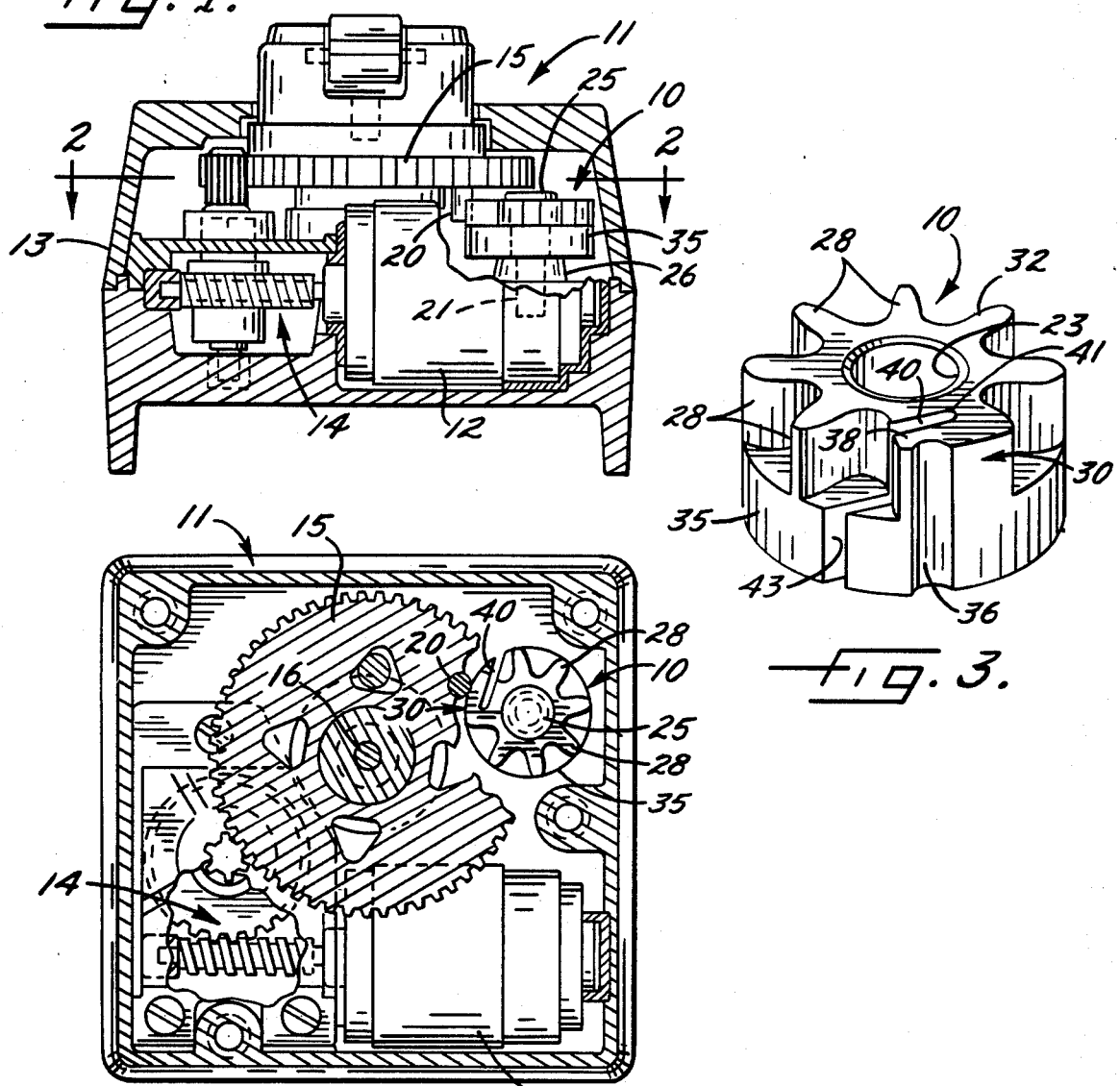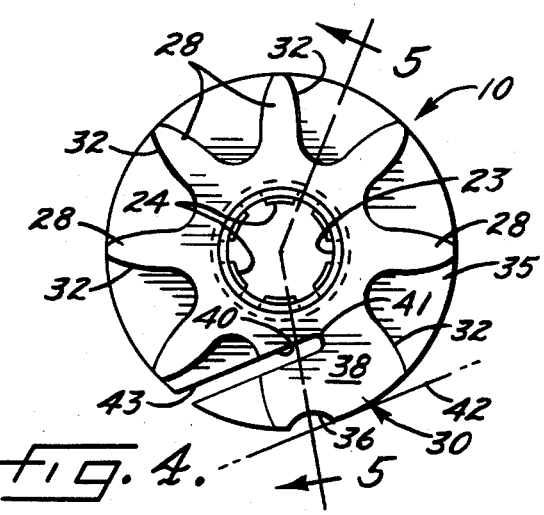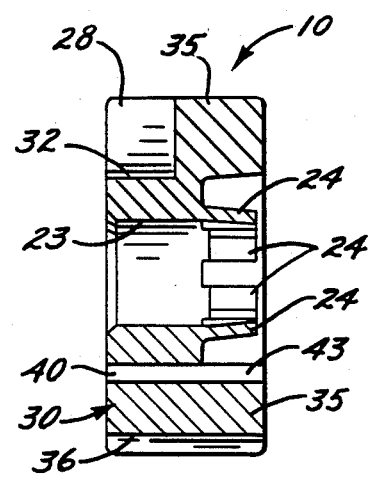

INDEXABLE STAR WHEEL

BACKGROUND OF THE INVENTION

This invention relates to a toothed star wheel adapted to rotate about a predetermined axis and adapted to be periodically indexed by an actuating pin rotatable about a parallel axis and along a circular path which intersects the outer periphery of the star wheel.

Lense U.S. application Ser. No. 545,780, filed Oct. 27, 1983, now U.S. Pat. No. 4,553,656 and assigned to the assignee of the present invention discloses a toothed star wheel which is incorporated in a power-operated actuator for a window. The actuator includes an electric motor which acts through a gear train to open and close the window. One of the gears carries an actuating pin which is spaced radially from the axis of the gear and which is adapted to coact with a star wheel having a series of angularly spaced teeth and intervening pockets formed around its outer periphery. During each revolution of the gear, the pin enters one of the pockets and bears against the flank of one of the teeth to rotatably index the star wheel through one step. After the window has been moved through a predetermined distance, the pin does not enter a pocket but instead comes into direct engagement with and is stopped by the tip of a relatively wide tooth formed on the periphery of the star wheel. As a result of such engagement, the motor is stalled so as to stop further movement of the window.

SUMMARY OF THE INVENTION

The general aim of the present invention is to provide a new and improved star wheel in which the wide tooth is uniquely constructed so as to absorb shock when struck by the pin and thereby reduce the stress imposed on the gear train when the motor is first stalled.

A more detailed object is to achieve the foregoing by providing the wide tooth with a weakened section which enables the outer end portion of the tooth to yield when the pin moves into engagement with the tip of the tooth.

The invention also resides in forming the weakened section by means of a slot enabling the outer end portion of the wide tooth to be resiliently cantilevered on the remaining portion of the tooth and to flex inwardly when struck by the pin.

These and other objects and advantages of the invention will become more apparent from the following detailed description when taken in conjunction with the accompanying drawings.

BRIEF DESCRIPTION OF THE DRAWINGS

FIG. 1 an elevational view of a typical actuator equipped with a new and improved star wheel incorporating the unique features of the present invention, certain parts being broken away and shown in section.

FIG. 2 is a cross-section taken substantially along the line 2—2 of FIG. 1.

FIG. 3 is a perspective view of the star wheel.

FIG. 4 is a top plan view of the star wheel.

FIG. 5 is a cross-section taken substantially along the line 5—5 of FIG. 4.

DETAILED DESCRIPTION OF THE PREFERRED EMBODIMENT

For purposes of illustration, the star wheel 10 of the present invention is shown in the drawings as incorporated in a power-operated window actuator 11 of the type disclosed in the aforementioned Lense application. Reference may be made to that application for a detailed disclosure of the construction and operation of the window actuator itself. It will suffice here to say that the actuator includes a reversible direct current motor 12 located within a housing 13 and adapted to act through a gear train 14 to open and close a window sash (not shown). One of the gears of the gear train is a spur gear 15 which is supported to rotate about a vertical axis 16 (FIG. 2). A depending actuating pin 20 is carried by the spur gear in radially spaced relation from the axis 16 and moves in a circular path during rotation of the gear.

The star wheel 10 is supported within the housing 13 to rotate about a stationary vertical pin 21 (FIG. 1) and is adapted to be periodically indexed by the actuating pin 20. Herein, the star wheel is made of a hard but resiliently yieldable material such as Delrin and is formed with a central bore 23 for receiving the pin 21. Angularly spaced fingers 24 (FIG. 5) at the lower end of the bore form a bushing which supports the star wheel for rotation on the pin 21. The star wheel is captivated axially by a head 25 (FIG. 1) on the pin 21 and by a boss 26 on the housing 13.

Angularly spaced teeth and intervening pockets are formed around the outer periphery of the star wheel 10. In the present instance, there are six teeth 28, one tooth 30 and seven pockets 32. The teeth 28 and the pockets 32 are all equal in width and are spaced equally from one another. The tooth 30 has a significantly greater angular width than the teeth 28 and fills the space which otherwise would be occupied by two teeth 28 and an intervening pocket 32. A circular disc 35 preferably is formed integrally with the lower ends of the teeth 28 and 30 and underlies the pockets 32, the disc being the same diameter as the tip diameter of the teeth.

Herein, the spur gear 15 is turned clockwise when the motor 12 is energized in a direction to open the window. As the spur gear 15 is turned, the actuating pin 20 enters one of the pockets 32, engages the flank of one of the teeth 28, 30 and turns the star wheel 10 counterclockwise through one-eighth of a revolution for each revolution of the gear. On succeeding revolutions of the spur gear, the actuating pin 20 enters successive pockets 32 until the wide tooth 30 has been indexed into the path of the pin so that, on the next revolution of the spur gear, the pin does not enter a pocket but instead moves into direct engagement with the tip of the wide tooth as shown in FIG. 2 and seats in an axially extending groove 36 formed in the tip. Because the actuating pin at that time exerts a generally radial force on the star wheel, the latter is not turned but instead stops the pin and acts reversely through the gear train 14 to place the motor 12 in a stalling condition and prevent further opening of the window.

In accordance with the present invention, the wide tooth 30 is weakened to enable the outer end portion 38 of the tooth to flex inwardly when the actuating pin 20 strikes the tip of the tooth. In this way, the tooth 30 absorbs shock otherwise resulting from abrupt stopping of the pin and causes less shock to be imposed on the gear train 14 and transmitted to the motor 12.

More specifically, the tooth 30 herein is weakened by forming a slot 40 in the tooth about midway between its tip and its root. The slot 40 extends completely through the tooth 30 from the top to the bottom thereof and opens out of that flank of the tooth which is engaged by the actuating pin 20 during clockwise rotation of the pin. The slot 40 terminates short of the opposite flank of the wide tooth and thus part of the outer end portion 38 of the tooth is resiliently cantilevered at 41 (FIG. 4) on the remaining portion of the tooth. The slot preferably extends parallel to a line 42 which is tangent to the periphery of the star wheel at the midpoint of the tooth 30. A slot 43 which is alined vertically with and defines a continuation of the slot 40 is formed completely through the lower disc 35, the slot 43 also opening out of the outer periphery of the disc.

By virtue of the slot 40, the outer end portion 38 of the tooth 30 is capable of resiliently flexing inwardly when the actuating pin 20 strikes the tip of the tooth. Accordingly, the gear train 14 stops less abruptly and with less shock so as to increase the service life of the actuator 11.

We claim:

1. A star wheel rotatable about a predetermined axis and adapted to be periodically indexed by an actuating pin rotatable about a parallel axis and in a path which intersects the outer periphery of the star wheel, said star wheel being made of resiliently yieldable material and having a series of angularly spaced teeth and intervening pockets around its outer periphery, said pin being adapted to enter said pockets and bear against the flanks of said teeth during rotation of said pin whereby the pin acts to index the star wheel, one of said teeth being a wide tooth having a substantially greater angular width than the other teeth and having an outer tip located to periodically engage said pin and prevent rotation thereof, and a weakened section formed in said wide tooth only inwardly of the tip thereof and permitting the outer end portion of said wide tooth to flex inwardly when engaged by said pin, each remaining tooth of said star wheel being free of a corresponding weakened section.

2. A star wheel as defined in claim 1 in which said weakened section is defined by a slot in said wide tooth.

3. A star wheel as defined in claim 2 in which said slot opens out of one flank of said wide tooth and terminates short of the other flank of said wide tooth wherby part of the outer end portion of said wide tooth is resiliently cantilevered on the remaining portion of the wire tooth.

4. A star wheel as defined in claim 3 in which said slot extends substantially parallel to a line which is tangent to the tip of said wide tooth at the midpoint of said wide tooth.

5. A star wheel as defined in claim 4 further including a disc formed integrally with the axially facing ends of said teeth and overlying said pockets, a slot formed in said disc and defining a continuation of the slot in said wide tooth, the slot in said disc opening out of the outer periphery thereof.

6. A star wheel as defined in claim 5 in which slots extend completely through said star wheel in an axial direction.

7. A star wheel rotatable about a predetermined axis and adapted to be periodically indexed by an actuating pin rotatable about a parallel axis and in a path which intersects the outer periphery of the star wheel, said star wheel being made of resiliently yieldable material and having a series of angularly spaced teeth and intervening pockets around its outer periphery, said pin being adapted to enter said pockets and bear against the flanks of said teeth during rotation of said pin whereby the pin acts to index the star wheel, one of said teeth being a wide tooth having a substantially greater angular width than the other teeth and having an outer tip located to periodically engage said pin and prevent rotation thereof, a slot formed through and extending transversely of said wide tooth, said slot opening out of one flank of said wide tooth and terminating short of the opposite flank of said wide tooth whereby part of the outer end portion of said wide tooth is resiliently cantilevered on the remaining portion of the wide tooth and flexes inwardly when the tip of said wide tooth is engaged by said pin.

8. A star wheel as defined in claim 7 in which said slot extends substantially parallel to a line which is tangent to the tip of said wide tooth at the midpoint of said wide tooth.

9. A star wheel as defined in claim 7 further including a disc formed integrally with the axially facing ends of said teeth and overlying said pockets, a slot formed in said disc and defining a continuation of the slot in said wide tooth, the slot in said disc opening out of the outer periphery thereof.

* * * * *